Sept. 21, 1965 R. B. SINGER ETAL 3,207,249
POWER PLANT SUPPORT MEANS FOR INDUSTRIAL VEHICLE
Filed March 20, 1963 5 Sheets-Sheet 1

INVENTORS:
ROBERT B. SINGER, ROGER W. GALLAGHER,
RUSSELL W. DANIELS, SAMUEL H. COTTRELL.
BY Mason, Kolehmainen,
Rathburn & Wyss.
ATTORNEYS

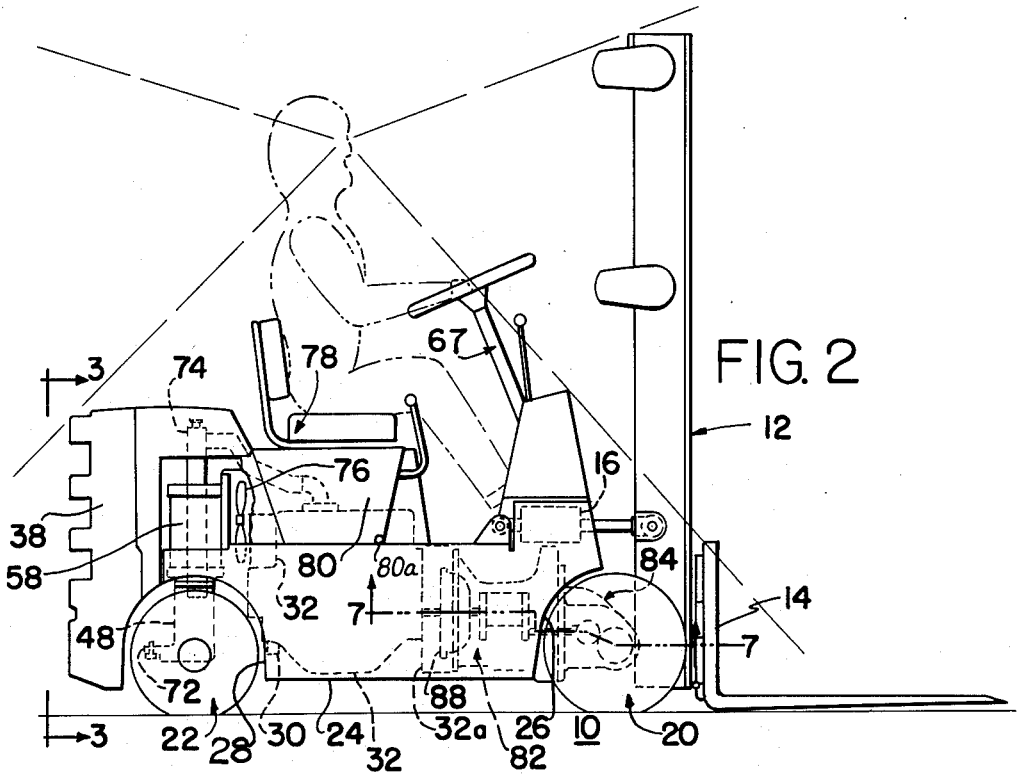
FIG. 2
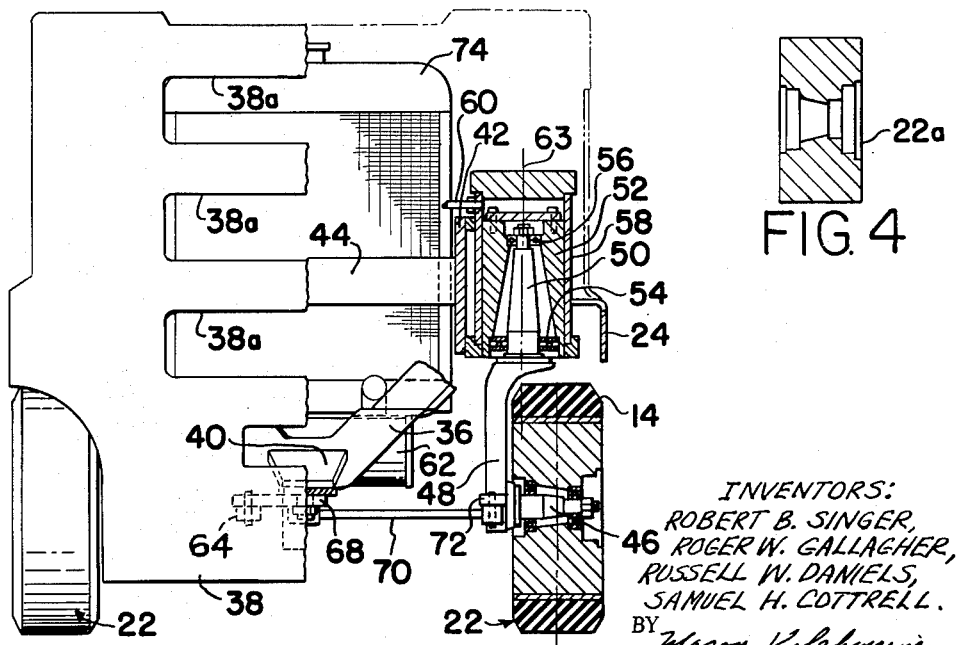
FIG. 3
FIG. 4
INVENTORS:
ROBERT B. SINGER,
ROGER W. GALLAGHER,
RUSSELL W. DANIELS,
SAMUEL H. COTTRELL.
BY Mason, Kolehmainen,
Rathburn & Wyss.
ATTORNEYS Sept. 21, 1965    R. B. SINGER ETAL    3,207,249
POWER PLANT SUPPORT MEANS FOR INDUSTRIAL VEHICLE
Filed March 20, 1963    5 Sheets-Sheet 3

INVENTORS:
ROBERT B. SINGER, ROGER W. GALLAGHER,
RUSSELL W. DANIELS, SAMUEL H. COTTRELL.
BY
Mason, Kolehmainen,
Rathburn & Wyss.
ATTORNEYS Sept. 21, 1965 R. B. SINGER ETAL 3,207,249
POWER PLANT SUPPORT MEANS FOR INDUSTRIAL VEHICLE
Filed March 20, 1963 5 Sheets-Sheet 5

INVENTORS:
ROBERT B. SINGER, ROGER W. GALLAGHER,
RUSSELL W. DANIELS, SAMUEL H. COTTRELL,
BY
Mason, Kolehmainen,
Rathburn & Wyss.
ATTORNEYS United States Patent Office 3,207,249
Patented Sept. 21, 1965

3,207,249
POWER PLANT SUPPORT MEANS FOR
INDUSTRIAL VEHICLE
Robert B. Singer, Roger W. Gallagher, and Russell W. Daniels, Minneapolis, and Samuel H. Cottrell, Mound, Minn., assignors to Minneapolis-Moline, Inc., Hopkins, Minn., a corporation of Delaware
Filed Mar. 20, 1963, Ser. No. 286,875
10 Claims. (Cl. 180—54)

The present invention relates generally to industrial vehicles and more particularly to industrial vehicles of the class known generally as lift trucks which are adapted for front end lifting and transporting of loads and are commonly utilized in factories, warehouses, industrial plants and the like for moving and stacking heavy and bulky loads.

In vehicles of this class, it is of prime importance and therefore an object of the present invention to provide a vehicle which is as small in size as possible to facilitate maneuvering in cramped areas such as narrow aisles while still providing for the lifting of loads that are of maximum weight and bulk to maximum heights without tipping of the vehicle.

To this end, it is an object of the present invention to provide such a vehicle in which the center of gravity of the vehicle is positioned as low and as far to the rear of the load as possible to afford the necessary stability when a heavy load is lifted to a maximum height and thus prevent the possibility of tipping over the vehicle and spilling or dropping of the load.

It is also an object of the present invention to provide a new and improved vehicle of the type described which although compact in size can still be easily serviced and maintained with a minimum of effort.

Another object of the present invention is to provide a new and improved vehicle of the type described which has steerable rear wheels supported by an automatic leveling device which keeps the vehicle in an approximately level attitude even though rough and uneven floor surfaces are encountered and, thus, the stability of the vehicle is further improved.

A further object of the present invention is to provide a new and improved vehicle wherein each of the rear wheels of the vehicle is independently supported, thus eliminating the need for a rear axle and providing needed space for location of other vehicle parts.

Yet another object of the present invention is the provision of a new and improved vehicle of the class described wherein the engine of the vehicle serves as a cross member of the undercarriage to further reduce weight and facilitate maintenance on or removal of the engine from the vehicle.

Still another object of the present invention is to provide a new and improved vehicle of the class described wherein the engine and drive mechanism driving the front wheels are positioned between side members of the vehicle undercarriage in order to maintain the center of gravity of the vehicle as low and as far to the rear as possible.

Another object of the present invention is to provide a new and improved vehicle of the type described wherein the loading of the front drive axle housing is reduced by the provision of independent support brackets which carry the brake assemblies for the front wheels and additionally carry a portion of the drive mechanism.

A further object of the present invention is to provide a new and improved vehicle of the type described wherein the operator's forward visibility is restricted to a minimum, thus making the vehicle easier to operate and reducing the possibility of accidents.

A still further object of the present invention is to provide a new and improved vehicle of the type described wherein the clutch and transmission mechanism are completely fluid controlled, thus reducing the necessity for various mechanical control linkages and facilitating the placement of components for easy and rapid servicing.

Yet still another object of the present invention is to provide a new and improved vehicle of the type described in which heat from the engine is removed toward the rear of the vehicle, thus preventing the operator from being uncomfortably hot when operating the vehicle.

The foregoing and other objects and advantages of the present invention are accomplished by the provision of a new and improved industrial vehicle of the type adapted for front end lifting and carrying of loads having an undercarriage including a pair of spaced apart side members. The vehicle is powered by an engine centered between and positioned toward the rearward end of the side members. A differential and drive wheel assembly extends generally transversely of the undercarriage and is positioned adjacent the lower forward ends of the side members. The engine output is coupled to the differential assembly through a fluid clutch and transmission assembly which is positioned between the side members and is supported from the engine and a pair of brackets attached to the inside of the side members. These brackets also extend forwardly to independently support brake assemblies for the drive wheels.

Steerable rear wheels, constructed of solid metal are independently supported for vertical and turning movement from a pair of hydraulic cylinders carried by the side member. These cylinders are interconnected by means of a fluid conduit means which provides for the automatic leveling of the vehicle on rough or irregular surfaces. The space between the rear wheels is utilized for the provision of a counterweight and radiator for the engine, thus providing compactness and the removal of heat from the engine to the rear of the vehicle. The operator's seat is positioned above the engine and affords the operator a forward view which is restricted to a minimum. The lifting mechanism for the vehicle is of the conventional controllable tilting type carried on the forward axle of the vehicle.

The invention, both as to organization and manner of operation, together with further objects and advantages will best be understood by reference to the following detailed description and claims when taken in conjunction with the drawings, in which:

FIG. 2 is a side elevational view of the vehicle of FIG. 1;

FIG. 3 is a rear end elevational view on line 3—3 of FIG. 2 of the vehicle of FIG. 1 with portions broken away to show construction details;

FIG. 4 is a diametrical sectional view of a solid rear wheel of the vehicle of FIG. 1;

Figure 7:
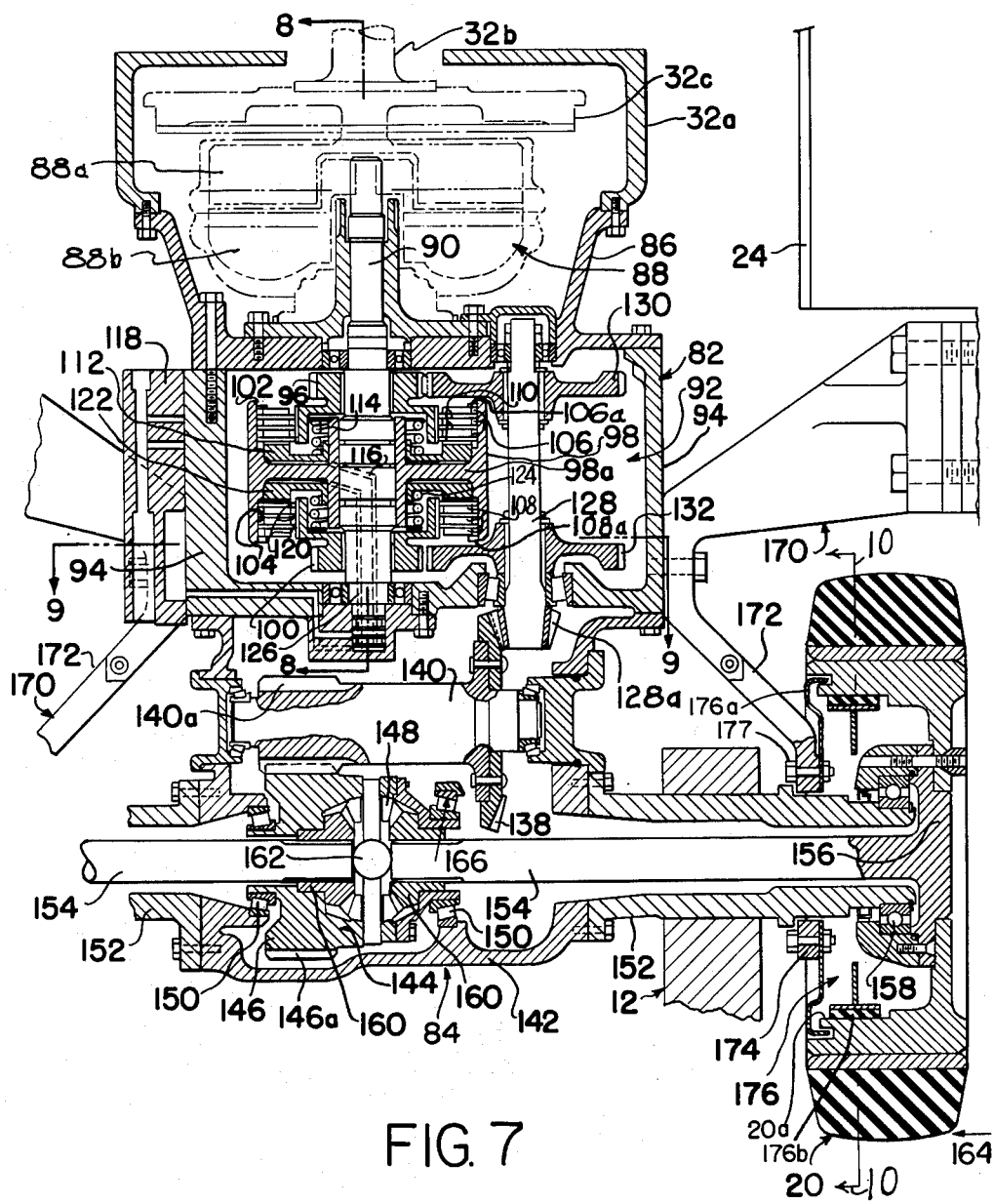
FIG. 7 is a sectional view of the drive assembly of the vehicle of FIG. 1 taken substantially along line 7—7 of FIG. 2.
Figure 9:
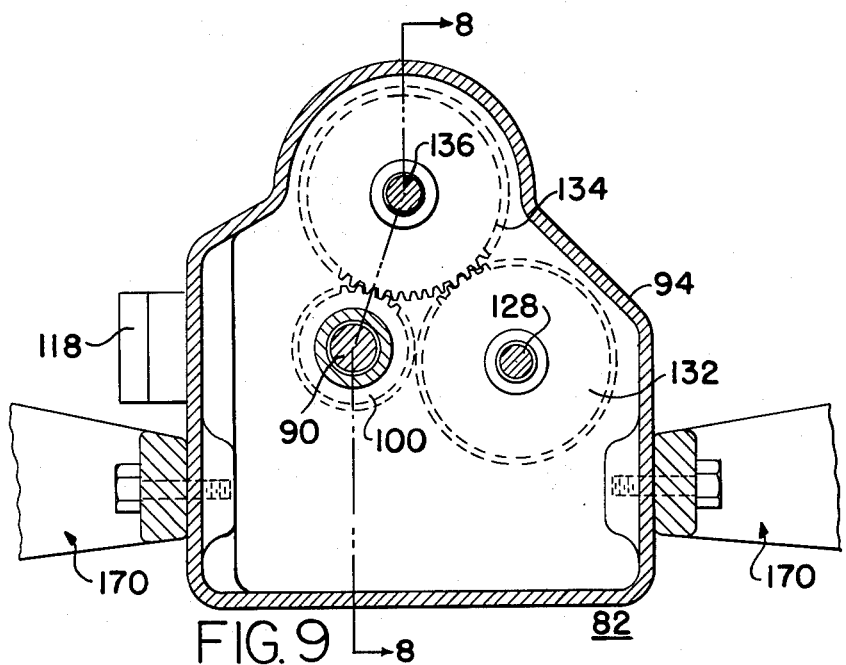
Figure 8:
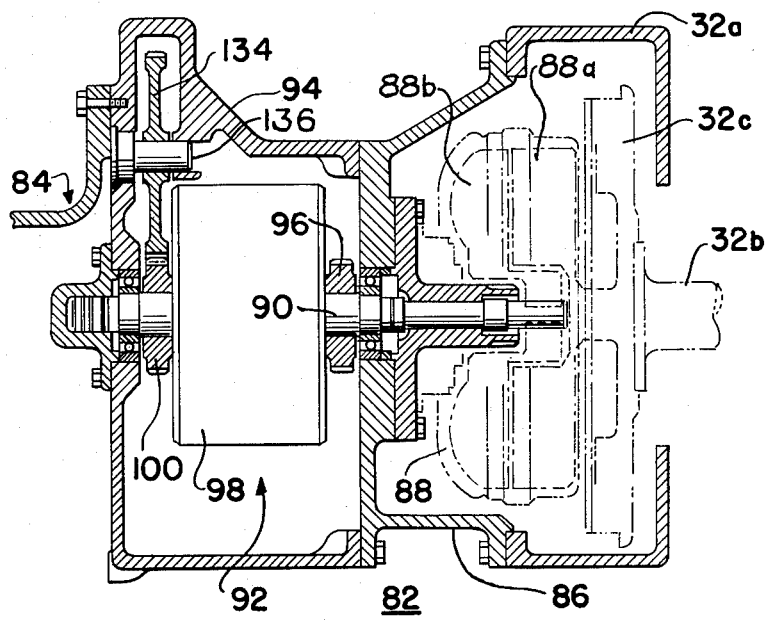

FIG. 8 is a sectional view of a portion of the drive assembly of FIG. 7 taken substantially along the line 8—8 of FIGS. 7 and 9; and FIG. 9 is a sectional view of a portion of the drive assembly of FIG. 7 taken substantially along the lines 9—9 of FIG. 7.

Figure 10:
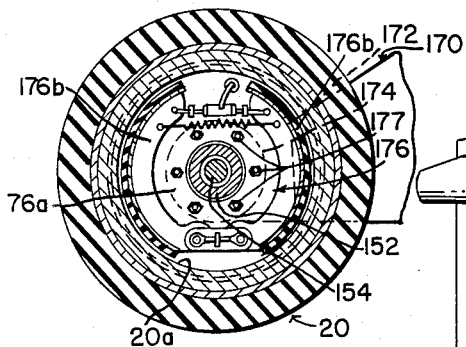

FIG. 10 is a sectional view taken substantially along the line 10—10 of FIG. 7.

Referring now to the drawings, there is illustrated a new and improved front end loading industrial vehicle constructed in accordance with the features of the present invention and referred to as a whole by the reference numeral 10. The vehicle is provided with a hydraulically operated front end lifting mechanism 12 which includes forks 14 for supporting the various loads which are lifted and carried by the vehicle.

The lifting mechanism 12 is supported for pivotal movement about the front axle of the vehicle and can be tilted forward or rearward to facilitate the picking up and setting down of loads carried on the forks. To this end, there are provided a pair of hydraulic cylinders 16 each having one end pivotally attached to the vehicle frame and the other or rod end pivotally attached to the lift mechanism so that by supplying hydraulic fluid to either end of the cylinders the lifting mechanism will be tilted forward or rearward as desired.

The vehicle itself includes an undercarriage 18 and a pair of front drive wheels 20 and a pair of steerable rear wheels 22. The undercarriage 18 includes a pair of longitudinal side members 24 which are constructed of heavy steel plate. The lower forward ends of the side members 24 are cut away as at 26 (FIGS. 1 and 2) to provide clearance for the front wheels 20 which are aligned therewith. The lower rearward ends of the side members are likewise cut away as at 28 (FIGS. 1 and 2) to provide for the movement of the steerable rear wheels 22.

Figure 5:
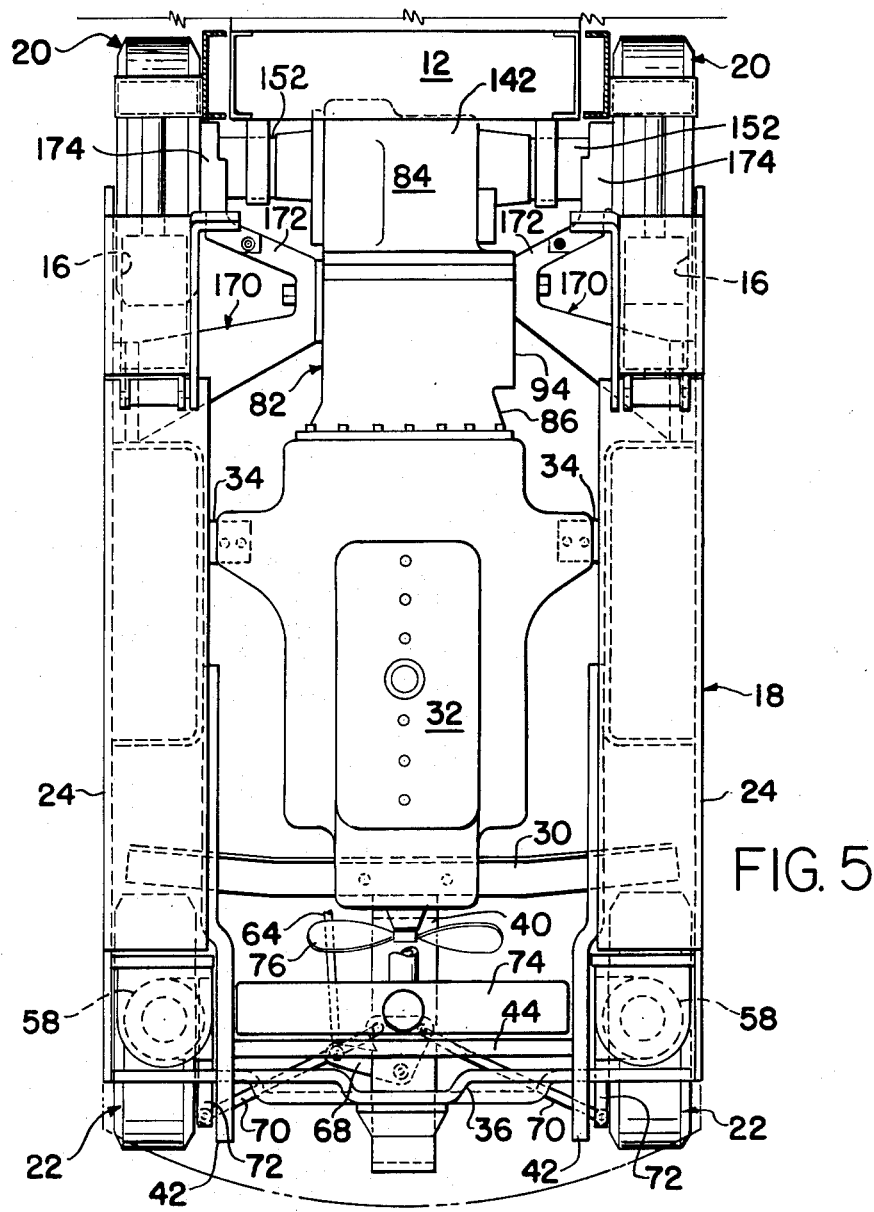
FIG. 5 is a top plan view of the undercarriage of the vehicle of FIG. 1.
Figure 6:
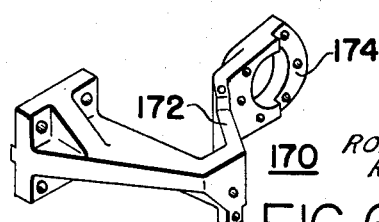
FIG. 6 is a perspective view of a transmission and brake assembly support bracket of the vehicle of FIG. 1.

The side members 24 are secured together by means of a lower tie bar 30 (FIG. 5) which serves as a mount for the rear end of an internal combustion engine 32 utilized to power the vehicle and its accessories. The forward end of the engine is supported from the side members by means of brackets 34 attached to the inside surfaces of the members.

There is also provided a heavy rear cross member 36 (FIGS. 3 and 5) which is joined to the side members 24 and provides support for a large rear counterweight 38. The member 36 is constructed of extra heavy steel plate and is connected at its center to steering support tongue 40 which is secured to the lower tie bar 30. Additionally, there are provided a pair of rearwardly extending heavy counterweight support brackets 42 (FIG. 5) which are secured to the side members 24 and are interconnected by an upper tie bar 44 as well as the rear cross member 36. The member 36, brackets 42 and tie bar 44 form a heavy structure which supports the heavy counterweight 38 and distributes the load therefrom to the side members 24. In addition, the tie bars and cross members secure the side members together at their rearward ends to form a structural undercarriage for the vehicle.

The engine 32 provides a simple means for centrally securing the side members 24 to one another and this construction provides an easy way of removing the engine from the undercarriage, if desirable, for necessary maintenance.

Each of the specially constructed rear wheels 22 is supported independently by means of a stub axle 46 which is carried at the lower end of an upwardly extending wheel support 48. These wheels as shown in FIG. 4 are constructed with a core 22a of solid metal such as steel or cast iron in order to add weight to the rear of the vehicle and thus lower and move the center of gravity farther toward the rear. The upper end of the support 48 is provided with a spindle 50 which is rotatably received in a piston 52 and supported for rotation therein by means of thrust bearings 54 and 56. The piston 52 is vertically movable within the hydraulic cylinder 58 which is supported by the side member 24. The upper ends of the cylinders 58 are interconnected by a conduit system 60 which is filled with hydraulic fluid. If one of the rear wheels encounters a bump in the surface it is traveling on, the fluid in its associated cylinder will be under greater pressure than in the opposite cylinder and will flow thereto through the conduit system, thus allowing the wheel encountering the bump to raise slightly and the other wheel to move downward slightly until the pressure is equal in both cylinders. This action provides for automatic leveling of the vehicle when it is traveling over rough or uneven surfaces and greatly increases the stability of the vehicle reducing the tendency of the vehicle to tip. It can be also seen that the individual supporting of the rear wheels as just described provides free space between the wheels which can be effectively utilized to accommodate portions of the counterweight 38 and a muffler 62. This space would not be available utilizing the conventional axle and knuckle-type steering. Furthermore, it can be seen from FIG. 3 that the vertical axis 63 of the spindle 50 is close to the center line 66 of the wheel, thus requiring only a minimum of space to accommodate the rear wheels as they are pivoted for steering the vehicle. These factors provide for a vehicle which has a minimum turning radius and thus is very useful for work in narrow aisles which are common in most industrial plants since space is generally at a premium.

Steering control of the rear wheels is provided by means of a steering system including a push-pull rod 64 (FIG. 5) which is connected to a steering wheel assembly 67 in a conventional manner. The rear end of the rod 64 is attached to a bell crank 68 pivoted on the steering support tongue 40. A pair of steering rods 70 are pivotally attached to separate pivots on the bell crank 68 and have their outer ends pivotally connected to torque arms 72 (FIG. 2) integrally formed on the wheel supports 48.

The space between the cylinders 58 forward of the counterweight 38 is utilized to accommodate the engine radiator 74. An engine driven fan 76 is provided forwardly of the radiator to move air through the radiator and through slots 38a provided in the counterweight 38. Thus, by directing the flow of cooling air toward the rear of the vehicle, the operator is not subjected to a blast of hot air from the front as is common in some vehicles.

Figure 1:
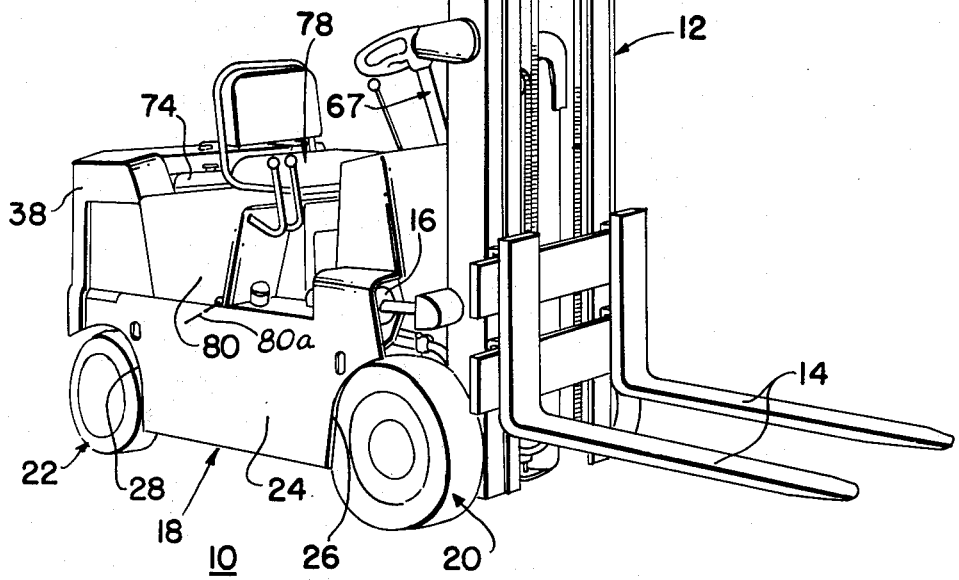
FIG. 1 is a perspective view of an industrial vehicle constructed in accordance with the present invention showing the general arrangement of the vehicle.

Referring to FIGS. 1 and 2, an operator's seat 78 is positioned over the center of the vehicle and is supported on a cover member 80 which is removably attached to the side members 24. If it is desired to work on the engine of the vehicle, the cover member and seat can be pivoted forward about the axis 80a to provide easy access to the engine. It should also be noted that the operator's seat is relatively high and he is afforded an almost unobstructed forward vision as well as unobstructed vision in all directions when he is sitting in the seat, thus greatly reducing the possibility of driving accidents.

In order to drivingly connect the engine 32 to the front drive wheels 20 of the vehicle, a clutch and transmission assembly 82 is secured to the forward end of the engine. This assembly is drivingly connected to a differential and drive wheel assembly 84 which extends generally transversely of the side members 24 and is positioned to lie adjacent the lower forward end thereof.

The assembly 82 is provided with a clutch housing 86 which is bolted to the forward end of an engine flywheel housing 32a in a conventional manner and contains a fluid clutch unit 88 having an input member 88a which is drivingly connected to the forward end of the engine output shaft 32b by means of the flywheel 32c carried by the shaft.

The fluid clutch unit 88 is provided with an output or driven member 88b which is drivingly connected to a central spindle 90 of a fluid transmission unit 92 which is housed in a transmission case 94 bolted to the clutch housing 86. The central spindle carries a forward drive gear unit 96 at one end, a central drum 98 and a reverse drive gear unit 100 at the other end. The drum 98 is secured to continually rotate with the spindle and is provided with annular recesses 102 and 104 at opposite ends separated by a center radial web portion 98a. Within each of these recesses respectively are carried a plurality of disks 106 and 108 which are keyed to rotate with the drum but are otherwise free to move axially within the drum toward and away from the center web 98a of the drum. Between the disks 106 there are provided a plurality of disks 110 which are keyed to rotate with the forward gear unit 96 and a retainer 106a is provided to prevent the disks 106 and 110 from moving out of the recess 102 in the drum. Between the web 98a and the disks 106 and 110, there is provided an annular piston 112 which is also slidable axially within the recess 102. The piston 112 is normally maintained against the web 98a by means of a coil spring 114 secured on the central tubular portion of the drum 98. An annular cavity is formed by the inner and outer circumferential walls of the recess 102 betwen the web 98a and the inner surface of the piston 112. This cavity is intermittently in communication with hydraulic fluid under pressure which is supplied by means of a drilled passage 116 in the spindle communicating with annular cavities at the end thereof and then through fluid lines to a control valve 118 on the side of the casing 94. By introducing hydraulic fluid into the cavity under pressure, the piston 112 will move axially outward toward the open end of the drum compressing the disks 106 and 110 together and thus causing the forward gear unit 96 to rotate with the spindle 90. When the hydraulic fluid in the cavity is vented to the return side of the system by the valve 118, the spring 114 moves the piston 112 inwardly and since the disks 106 and 110 are no longer held together but can slip freely, the gear unit 96 no longer rotates with the spindle.

A similar valve operated hydraulically controlled system is utilized for drivingly connecting the reverse gear unit 100 to rotate with the spindle 90. This system includes the disks 120 sandwiched between the disks 108 in the recess 104, an annular piston 122 similar to piston 112, a return spring 124 and a drilled spindle passage 126. The disks 108 and 120 are retained within the drum by a retainer 108a similar to the retainer 106a. Thus, by actuating the hydraulic valve 118, the spindle 90 can be alternately engaged to drive the forward gear unit 96 or the reverse gear unit 100 as desired by the vehicle operator.

A drive shaft 128 is positioned to rotate within the casing 94 in parallel axial alignment with the spindle 90. At one end of the shaft there is provided a forward driven gear 130 which continually meshes with the gear unit 96 and, consequently, drives the shaft 128 in an opposite direction to the spindle 90 when the unit 96 is engaged to rotate with the spindle. The shaft 128 is also provided with a reverse drive gear 132 which is positioned adjacent the reverse gear unit 100. The gear 132 meshes with a reverse idler 134 (FIG. 9) carried on an idler shaft 136, the former being in meshing relation with the gear unit 100. Thus, when the gear unit 100 is engaged to rotate with the spindle 90, the drive shaft 128 rotates in the same direction to provide for reverse direction movement of the vehicle.

The forward end of the drive shaft 128 extends outwardly forward of the transmission casing 94 and is provided with a bevel gear 128a. The bevel gear 128a meshes with another bevel gear 138 carried on a differential drive shaft 140 which is supported for rotation in a central differential housing 142 bolted to the casing 94. The central housing 142 encases a differential gear assembly 144 having a rotating differential case 146 carrying a plurality of differential bevel gears 148. The shaft 140 is provided with gear teeth 140a which mesh with teeth 146a provided on the exterior surface of the differential gear case 146 in order to drive the case 146 which is supported on bearings 150 in the housing 142.

Attached to the sides of the central housing 142 there are provided a pair of tubular axle housings 152 which extend outwardly from the sides of the housing 142. These housings serve as supports for the lifting mechanism 12 and house drive axles 154 of the vehicle. The drive axles are provided at their outer ends with integral flanges 156 to which the drive wheels 20 are attached by lug bolts in a conventional manner. The flanges 156 are supported for rotation at the ends of the axle housing by means of bearings 158 carried on the outer surface of the outer ends of the axle housings 152. The inner ends of the axles are splined to receive internally splined bevel gears 160 which mesh with the differential bevel gears 148 in the case 146.

The gears 160 are rotatably supported within bearing surfaces provided in the differential case 146 and the axles 154 are separated from each other at their inner ends by means of a thrust ball 162. This arrangement provides a semifloating axle which reduces wear on the bearings 158 normally caused by side thrust loads. When a side thrust load in the direction of the arrow 164 (FIG. 7) is transmitted to the wheel, the bearing 158 acts as a fulcrum point and the force moment caused by the force is transmitted down the axle through the gears 160, differential case 146, and bearings 150 to the central housing 142 in the direction of the arrow 166. Also, a component of the thrust in the axle is transmitted through the ball to the other axle and likewise then distributed to the other bearing 150 on the other side of the central housing 142.

In order to reduce the load on the clutch and transmission assembly 82 and the differential and drive wheel assembly 84 normally encountered when lifting heavy loads, there are provided a pair of support brackets 170 which are secured to the insides of the side members and are attached to the side walls of the transmission casing 94, thus tying the forward ends of the side members together through the clutch and transmission assembly 82. This arrangement allows for easy maintenance of the assembly since the brackets can rapidly be disconnected from the side members and the transmission casing 94 and front axle assembly can easily be removed from the vehicle.

Since the differential and drive wheel assembly 82 carries almost all of the load which is placed on the lifting mechanism 12 in addition to the load caused by the weight of the forward portion of the vehicle, it is a point of high stress. In order to reduce this stress and specifically to reduce the stress on the axle housings 152 and central housings 142, the brackets 170 are provided with forwardly and outwardly extending portions 172 which include annular flanges 174 which encircle the outer portions of the axle housings 152. The flanges 174 support stationary brake assemblies 176 for the front drive wheels of the vehicle and thus greatly reduce the torsional moments on the axle housing which occur during braking of the vehicle.

Each of the brake assemblies 176 includes a fixed annular plate 176a carrying a pair of brake shoes 176b which are movable outwardly upon application of the brakes to engage interdrum surfaces 20a on the wheels 20. The central opening in the annular plate 176a encircles and is spaced radially outwardly from the axle housing 152. The plate 176a is detachably secured to outer annular surfaces of flanges 174 of bracket 170 by means of a plurality of bolts 177 spaced in a circular configuration around the flange. Thus, any braking torque acting on the plate 176a as a result of braking the wheels 20 is carried by the brackets 170 and not by the axle housing 152.

The brackets themselves are constructed of heavy steel and serve as a simple and readily detachable means for tying the front end driving mechanism of the vehicle into the undercarriage structure.

While there has been shown and described a single embodiment of the present invention, it will be apparent to those skilled in the art that numerous changes and modifications will occur, and it is intended in the appended claims to cover all those changes and modifications as fall within the true spirit and scope of the present invention.

What is claimed as new and desired to be secured by Letters Patent of the United States is:

1. An industrial vehicle of the type adapted for front end lifting and carrying of loads, comprising an undercarriage having a pair of parallel spaced apart side members, a differential and drive wheel assembly positioned adjacent the lower forward end of said undercarriage, said assembly including a central differential housing, a pair of outwardly extending axle housings secured thereto and a pair of drive wheels positioned at the outer ends thereof, an internal combustion engine supported by and positioned between said side members having an output shaft extending forwardly and positioned parallel to and between said side members, clutch and transmission means having a casing secured between the forward end of said engine and said differential housing for drivingly connecting said engine to said differential assembly to drive said wheels, and a pair of detachable support brackets, each having a rear portion attached to the inside of a respective side member extending forwardly and inwardly therefrom to an inner section, which portion supports and is detachably secured to a respective opposite side of said casing.

2. A vehicle as defined in claim 1 wherein each of said brackets is provided with a forward portion extending outwardly and forwardly from said inner section forming a forward annular flange encircling a respective axle housing adjacent the outer end thereof.

3. An industrial vehicle of the type adapted for front end lifting and carrying of loads, comprising an undercarriage having a pair of parallel spaced apart side members, an internal combustion engine positioned between said side members having an output shaft extending forwardly and positioned parallel to and between said side members, a cross-member secured to and extending transversely between said side members adjacent the rearward ends thereof adapted to support the rear end of an internal combustion engine, a pair of engine support brackets each secured to the inner surface of a side member forwardly of said cross-member and adapted to support the forward end of said engine, a differential and drive wheel assembly positioned adjacent the lower forward end of said undercarriage, said assembly including a central differential housing, a pair of outwardly extending axle housings secured thereto and a pair of drive wheels positioned at the outer ends thereof, clutch and transmission means having a casing secured between the forward end of said engine and said differential housing for drivingly connecting said engine to said differential assembly to drive said wheels, a pair of brackets, each having a rear portion detachably secured to the forward end of the inside of a respective side member and extending inwardly and forwardly therefrom to an inner section detachably secured to a respective side of said casing and detachable means for securing said brackets to said side members said detachable means removable for allowing forward withdrawal of said differential and drive wheels assembly when said casing is detached from the forward end of said engine.

4. A vehicle as defined in claim 3 wherein each of said brackets is provided with a portion extending outwardly and forwardly from said inner section forming a forward annular flange supporting and encircling a respective axle housing adjacent the outer end thereof, said flange having an outward annular face disposed to face the inner side of a respective drive wheel, and brake means for braking said drive wheels, each including a fixed brake plate member carrying a brake shoe assembly movable outwardly to brakingly engage a respective drive wheel, said brake plate members encircling said axle housings and detachably secured to said annular outer faces on the forward flanges of said brackets.

5. An industrial vehicle of the type adapted for front end lifting and carrying of loads, comprising an undercarriage having a pair of parallel spaced apart side members, each of said side members including an outer side plate and an inward engine supporting structure, a differential and drive wheel assembly extending generally transversely of said side members adjacent the lower forward end of said undercarriage, said assembly including a central differential housing, a pair of outwardly extending axle housings secured thereto and a pair of drive wheels positioned adjacent the outer ends of said axle housings, drive means secured to said differential housing including a casing member, a pair of brackets, each detachably secured to the inside surface of the outer side plate of a respective side member, each of said brackets including a portion extending inwardly and forwardly from said side plate to form an inner section disposed adjacent to and detachably secured to a respective side face of said casing member, each of said brackets including a portion extending forwardly and outwardly from said inner section having a forward end flange encircling a respective axle housing adjacent the outer end thereof, and brake means for brakingly engaging said drive wheels including a pair of brake assemblies, each engageable with a respective drive wheel, each of said brake assemblies including a fixed annular plate carrying movable brake shoes for engaging a respective wheel, each of said plates disposed to encircle and spaced outwardly from a respective axle housing, and means for detachably mounting each of said plates on an outer face of a respective end flange of said bracket.

6. An industrial vehicle of the type adapted for front end lifting and carrying of loads, comprising an undercarriage having a pair of parallel spaced apart side members, an internal combustion engine positioned between said side members having an output shaft extending forwardly from said engine and parallel to and between said side members, a cross-member secured to and extending transversely between said side members adjacent the lower rearward ends of said members adapted to centrally support the rear end of said engine, a pair of engine support brackets each secured to the inner surface of a side member forwardly of said cross-member and adapted to support the forward end of said engine, a differential and drive wheel assembly extending generally transversely of said side members adjacent the lower forward end of said undercarriage, said assembly including a central differential housing, a pair of outwardly extending axle housings secured thereto and a pair of drive wheels positioned adjacent the outer ends of said axle housings, drive means secured to said differential housing including a casing member extending between the forward end of said engine and said central differential housing, a pair of brackets, each having a rearward section detachably secured to the inside of a respective side member and extending forwardly of said rearward section adjacent a side of said casing member and detachably secured thereto, each of said brackets also including a portion extending forwardly of said casing member having a forward end flange disposed to encircle said axle housing adjacent the outer end thereof, brake means for brakingly engaging said drive wheels including a pair of brake assemblies, each engageable with a drive wheel and including a fixed annular plate detachably mounted on and supported by said annular flange of a respective bracket, and fluid clutch and transmission means positioned within said casing member for drivingly connecting the output shaft of said engine to said differential and drive wheel assembly.

7. Apparatus as defined in claim 6 additionally including a pair of steerable rear wheels positioned adjacent the rearward ends of said side members including a pair of fixed vertically extending cylinders each carried by a respective one of said side members, piston means vertically and rotatably movable in said cylinders including downwardly extending wheel supports having horizontal axles carrying said wheels, conduit means interconnecting the upper ends of said cylinders for providing a passage for fluid flow between said cylinders to level the rear of said vehicle when the loads on said rear wheels are unbalanced and hand actuated steering means for rotating said pistons in said cylinders to steer said vehicle.

8. A vehicle of the type adapted for front end lifting and carrying of loads comprising an undercarriage having a pair of parallel spaced apart side members, a differential and drive wheel assembly extending generally transversely of said side members adjacent the lower forward end of said undercarriage, said assembly including a differential and axle housing and a pair of drive wheels positioned at opposed ends of said axle housing adjacent the forward ends of said side members, a pair of steerable rear wheels positioned adjacent the rearward ends of said side members, and suspension means for said rear wheels including a pair of vertical cylinders secured adjacent the rearward ends of said side members and piston means vertically movable in said cylinders, wheel support means including vertically upwardly extending spindles journaled for rotation about the vertical axes of said piston means and including downwardly extending members having horizontal axles thereon for supporting said rear wheels, said suspension means including fluid conduit means interconnecting the upper ends of said cylinders for allowing a fluid flow between said cylinders to provide for transverse leveling of the rear of said vehicles when the load on said rear wheels is not balanced.

9. Apparatus as defined in claim 8 wherein said rear wheels are constructed of heavy solid metal.

10. An industrial vehicle of the type adapted for front end lifting and carrying of loads comprising an undercarriage having a pair of spaced apart longitudinal side members, an internal combustion engine positioned between said side members having a forwardly extending shaft, a clutch and transmission assembly including a casing secured to the forward end of said engine, fluid clutch means in said casing including a driving member secured to rotate with said engine shaft and a driven member coaxial therewith, a transmission drum in said casing coaxial with and connected to rotate with said driven member, said drum including a central spindle and annular recesses at both ends separated by a radial web, a forward gear pinion rotatable on said spindle including a portion extending into one of said recesses, a reverse gear pinion rotatable on said spindle including a portion extending into the other of said recesses, fluid operated engaging means in said recesses for alternately connecting said gear pinions to rotate with said drum, an output shaft rotatably mounted in said casing axially parallel to said drum, first gear means on said output shaft continually meshing with said forward gear pinion, second gear means including a gear on said output shaft drivingly connected to said reverse gear pinion to rotate in the same direction thereof, a differential and drive wheel asembly including a pair of transversely extending drive wheel axles, a pair of axle housings, secured to said casing, and differential gear means for drivingly connecting said output shaft to said drive axles, drive shaft means parallel to said drive wheel axles for drivingly connecting said output shaft and said differential and drive wheel assembly, and bracket means securing opposed sides of said casing to said side members and including forwardly extending flanged portions encircling said drive axles and axle housings.

References Cited by the Examiner

UNITED STATES PATENTS

| | | | |
|---|---|---|---|
| 1,209,209 | 12/16 | Ross | 180—70 |
| 1,348,333 | 8/20 | Swan | 180—41 |
| 2,232,972 | 2/41 | Ronning | 280—87 |
| 2,471,429 | 5/49 | Hawkins | 180—54 |
| 2,494,505 | 1/50 | Bouchard | 180—54 X |
| 2,625,285 | 1/53 | Weaver | 180—54 X |
| 2,736,412 | 2/56 | Livezey. | |
| 2,851,119 | 9/58 | Thompson et al. | 180—54 |

FOREIGN PATENTS

| | | |
|---|---|---|
| 457,792 | 12/36 | Great Britain. |
| 674,049 | 6/52 | Great Britain. |

A. HARRY LEVY, *Primary Examiner.*